United States Patent

Stadelmann et al.

[11] 3,966,182
[45] June 29, 1976

[54] LENGTHWISE-ADJUSTABLE GAS SPRING

[75] Inventors: Ludwig Stadelmann; Fritz Bauer, both of Altdorf, Germany

[73] Assignee: Suspa Federungstechnik Fritz Bauer & Sohne oHG, Altdorf, near Nurnberg, Germany

[22] Filed: July 30, 1975

[21] Appl. No.: 600,523

[52] U.S. Cl. ............................. 267/124; 188/300; 248/400; 267/65 R
[51] Int. Cl.² ........................................ F16F 9/34
[58] Field of Search ................. 267/65 R, 113, 118, 267/124; 188/297, 300, 311, 313, 315; 248/354 H, 400; 297/345, 347, 353, 355

[56] References Cited
UNITED STATES PATENTS

| | | | |
|---|---|---|---|
| 3,171,643 | 3/1965 | Roos | 267/124 X |
| 3,711,054 | 1/1973 | Bauer | 248/400 |
| 3,825,244 | 7/1974 | Bauer | 267/124 |
| 3,837,704 | 9/1974 | Bauer | 297/345 |

*Primary Examiner*—Evon C. Blunk
*Assistant Examiner*—Johnny D. Cherry
*Attorney, Agent, or Firm*—Browdy and Neimark

[57] ABSTRACT

A lengthwise-adjustable, compressed-gas-filled gas spring, particularly for continuous height adjustment of chairs, seats, tables, or the like, has two cylinders, coaxially mounted one inside the other, and leaving an annular chamber therebetween. A piston and piston rod are displaceably provided within the inner cylinder, the piston sealingly dividing the cylinder into a first housing chamber, on the piston rod side, and a second housing chamber. The piston rod extends sealingly out of the cylinders. The first housing chamber has a fluid connection to the annular chamber at all times. The inner cylinder has a passageway therethrough near the end opposite the piston rod end, and is axially displaceable within the center cylinder between a first position at which the passageway is sealed off and a second position at which a fluid connection is allowed between the second housing chamber and the annular chamber.

9 Claims, 2 Drawing Figures

LENGTHWISE-ADJUSTABLE GAS SPRING

FIELD OF THE INVENTION

The present invention relates to lengthwise-adjustable gas springs and more particularly to such springs in which the inner cylinder itself serves as a valve means for adjusting the length of the gas spring.

BACKGROUND OF THE INVENTION

U.S. Pat. No. 3,837,704 discloses a lengthwise-adjustable, compressed-gas-filled gas spring, particularly for continuous height adjustment of chairs, seats, tables, or the like, with two cylinders mounted coaxially one inside the other, and with a piston displaceably mounted in the inner cylinder, said piston being provided with a seal resting against the inside wall of the inner cylinder which divides the internal chamber of the inner cylinder into two housing chambers. The piston is connected with a piston rod, which emerges from one end of the cylinder in a sealed manner. The housing chamber on the piston rod side is always connected by at least one opening with the annular chamber between the cylinders and with a valve which is provided at the opposite end. The valve serves to connect or separate the other housing chamber with or from the annular space via at least one passageway. In this case, a valve pin is provided in the sealing plug of the outer cylinder and the inner cylinder at the end opposite the piston-rod end. The valve pin is capable of being pushed into the gas spring to connect the housing chamber with the annular chamber.

The inside of the sealing plug is provided with a bore with a slightly larger diameter than the cylindrical part of the release pin and an expansion of the bore to accept a seal. A bypass chamber is provided, connectable with this inside part of the sealing plug, said chamber being connected on one side via a bore in the inside part with the cylindrical annular chamber and on the other side via a connecting chamber which is formed when the actuating pin is pushed in between the annular groove of the latter and the inside wall of the seal. In this known lengthwise-adjustable gas spring a sprecial valve is therefore provided at one end.

This lengthwise-adjustable gas spring has proven excellent in practice.

SUMMARY OF THE INVENTION

The goal of the present invention is to simplify a lengthwise-adjustable gas spring of the type described hereinabove with regard to its construction and assembly costs and simultaneously to increase its dependability.

This goal is achieved according to the present invention by having the end base of the inner cylinder closed off, with its front side facing outward by having the inner cylinder provided with a passageway in its wall, and sealed in the area of said passageway. The inner cylinder is also made to be axially displaceable within the outer cylinder between two positions, in which the passageway is either sealed off from the annular space or is connected therewith. The essence of the present invention therefore consists in the inner cylinder serving simultaneously as a valve and as an actuating device therefor, with no significant additional expense being required for construction of the inner cylinder. A better seal with respect to the outside is provided by giving the inner cylinder a larger diameter than the operating pin of a valve. In addition, the gas chamber is enlarged, without increasing the structural length and outside diameter of the gas spring, since the inner cylinder extends at least up to the end face of the gas spring opposite the piston-rod end, so that the damping characteristics of the spring can be improved in a position which can be set to a predetermined length.

The measures according to the present invention make it possible to guide the inner cylinder at the end of the outer cylinder opposite the piston-rod end in a simple sleeve. Advantageously, it is provided with a stop which prevents its being expelled from the outer cylinder, said stop capable of being given the form of a stop ring which rests against the inside end face of the sleeve, wherein such a stop ring can be formed simply by rolling out the inner cylinder. It has been found advantageous to locate the passageway in the vicinity of an annular channel formed by a constriction of the wall of the inner cylinder, said channel bridging a seal in the sleeve when the inner cylinder is slid into the gas spring.

In order to suppress any tilting of the inner cylinder and the piston rod and consequently to eliminate the danger of leakage of the gas spring, it is advantageous to guide the inner cylinder in a manner which is practically free of radial play at the piston-rod end, wherein this guidance can be effected by guiding the inner cylinder radially on a tubular stop of a sealing sleeve which seals off the outer cylinder in a gastight manner and seals the piston rod as it emerges from the outer cylinder.

The passageway in the wall of the inner cylinder can be constructed in a simpler manner as a flow throttle by appropriate dimensioning.

Further advantages and features of the present invention will emerge from the description of an embodiment with reference to the drawing.

DETAILED DESCRIPTION OF A PREFERRED EMBODIMENT

Figure 1:
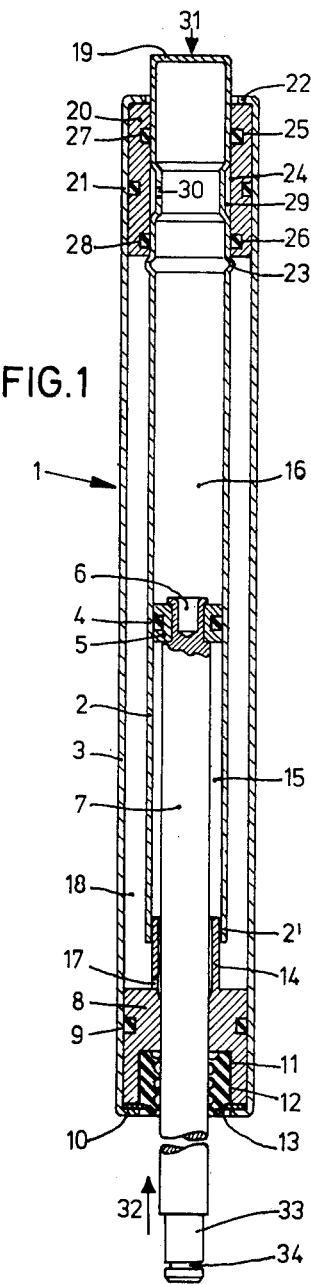
FIG. 1 is an axial lengthwise section throgh a gas spring according to the present invention with an inner cylinder serving as an actuating valve with the valve in the closed position.

The gas spring is provided with a housing 1, consisting primarily of two concentrically mounted steel tubes of different diameters sliding into one another, i.e. an inner cylinder 2 and an outer cylinder 3. A piston 5 is axially displaceably mounted in inner cylinder 2, with an annular seal 4 on its outside circumference, said piston bearing via said seal against the inside wall of inner cylinder 2. The piston 5 is further attached to a hollow bearing 6 of a piston rod 7 which is mounted coaxially in the housing and emerges therefrom. The piston rod is guided in a manner practically free of radial play in a sealing sleeve 8, said sealing sleeve being press-fitted in outer cylinder 3 and sealed off therefrom by means of an annular seal 9 on its outside circumference. This sealing sleeve 8 is prevented from being forced out of outer cylinder 3 by means of a bead 10 on outer cylinder 3 which fits over its outwardly facing end face.

A lip seal 12 is located in a cylindrical recess 11 in a sealing sleeve 8, the sealing lips of said lip seal resting against piston rod 7, so that the latter can also be led out from housing 1 in a sealed manner. Lip seal 12 is protected against axial displacement with respect to sealing sleeve 8 by means of a retaining disc 13 mounted between sealing sleeve 8 and bead 10. Inner cylinder 2 has its end 2' on the piston-rod side resting against a tubular stop 14 mounted coaxially on inner cylinder 2, said stop 14 being mounted on sealing sleeve 8 in such a manner that inner cylinder 2 is practically free of radial play but is supported in an axially displaceable manner.

Piston 5 divides the inside chamber of inner cylinder 2 into two housing chambers, namely a housing chamber 15 which faces the end of housing 1 from which the piston rod emerges, and a housing chamber 16 which is located on the other side of piston 5. Housing chamber 15 on the piston-rod side is always connected by a bore 17 in stop 14 with annular space 18 formed between inner cylinder 2 and outer cylinder 3. Tubular stop 14, at least from said bore 17 to its free end, has a larger inside diameter than the diameter of piston rod 7.

Inner cylinder 2 is sealed in a gastight manner at its end face by a plate 19 at the end of housing 1 which is opposite the end from which the piston rod emerges. It is led out of housing 1 at this end by a cylindrical annular sleeve 20. Sleeve 20, like sealing sleeve 8, is press-fitted in outer cylinder 3 and is sealed off from said outer cylinder in a gastight manner by an annular seal 21. It is prevented from sliding out of housing 1 by a bead 22 which fits over its outwardly facing end face.

The inner cylinder is prevented from sliding out of housing 1 by means of a stop ring 23 located in annular space 18 and made for example by rolling out. Said stop ring has a larger diameter than the coaxial cylindrical bore 24 which guides the inner cylinder in sleeve 20. In the resting position shown in FIG. 1, wherein stop ring 23 rests against the inward-facing end face of sleeve 20, the inner cylinder projects from housing 1. Annular seals 27, 28 are provided in corresponding annular grooves 25, 26 in bore 24 of sleeve 20, separated by a distance such that each seals off inner cylinder 2 in a gastight manner with respect to sleeve 20. A constriction which serves as an annular channel 29 is provided on inner cylinder 2, said constriction (in the resting position of inner cylinder 2 shown in FIG. 1) being located between the two annular seals 27 and 28. The distance between these two annular seals 27 and 28 is therefore always greater than the axial length of this annular channel 29. The wall of inner cylinder 2 in the vicinity of annular channel 29 is provided with at least one passageway 30 shaped like a throttle bore, said passageway connecting annular channel 29 with housing chamber 16.

The gas spring described and shown above is filled with compressed gas, advantageously with nitrogen, i.e. housing chambers 15, 16 and annular chamber 18 are under gas pressure. The gas spring operates as follows:

With inner cylinder 2 in the resting position shown in FIG. 1, passageway 30 is located between the two annular seals 27 and 28 so that there is no connection between housing chamber 16 and annular chamber 18, while a connection between housing chamber 15 on the piston-rod side and annular chamber 18 is always provided by bore 17. Piston 5 and hence piston rod 7 are therefore in a resting position as shown for example in FIG. 1. If a force is now exerted from outside on piston rod 7, it is cushioned by the gas filling in housing chamber 16 or the gas filling in housing chamber 15 and in annular chamber 18.

Figure 2:
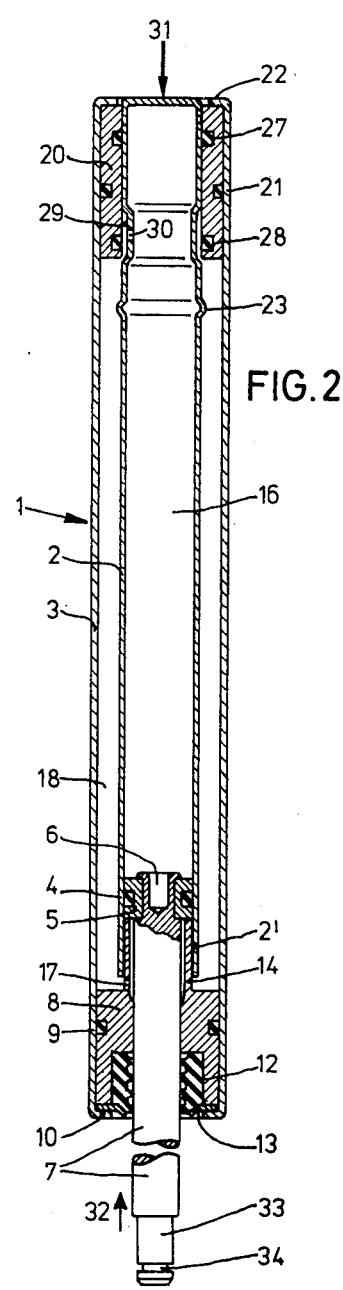
FIG. 2 shows the gas spring in the design shown in FIG. 1 with the valve in the operated position.

If inner cylinder 2, by the exertion of a corresponding actuating force 31 upon the outwardly sealing plate 19, is pushed sufficiently far into housing 1 that annular channel 29 bridges the inside annular seal 28 of sleeve 20, as shown in FIG. 2, gas can flow from housing chamber 15 on the piston-rod side through bore 17, via annular chamber 18, annular channel 29, and passageway 30 into housing chamber 16 on the other side of piston 5. Since the area of piston 5 subject to gas pressure on the side facing housing chamber 16 is larger by the cross section of piston rod 7 than its area which faces housing chamber 15, said chamber being filled with compressed gas and being located on the piston-rod side, piston 5 and hence piston rod 7, in the absence of a corresponding counterforce acting upon piston rod 7 from outside, is pushed out of housing 1. On the other hand, if an inward-pushing force 32 is exerted on piston rod 7, said force being greater than the product of the gas pressure and the cross section of piston rod 7, the latter is pushed into housing 1. If actuating force 31 is removed from plate 19 of inner cylinder 2 with piston rod 7 in the desired set position and hence piston 5 in the same position, the inner cylinder will slide back to the resting position shown in FIG. 1 so that the connection between housing chamber 16 and annular chamber 18 is once again broken. Piston 5 and hence piston rod 7 then remain in the newly set position relative to housing 1. Of course, inner cylinder 2 can be pushed only so far into housing 1 that it does not close off bore 17 in the pushed-in position. The ratio of the piston rod diameter to the inside diameter of outer cylinder 3 is advantageously less than 0.5, so that the gas spring has a nearly horizontal path-force curve, i.e., the forces required to bring piston rod 7 to its completely extended and completely inward-pushed positions will differ only slightly.

Piston rod 7 is provided at its free end with a pin 33, said pin having a somewhat smaller diameter than piston rod 7 and having an annular groove 34 in the vicinity of its free end. It is thus possible to attach the piston rod to an object, for example a chair frame, as described in U.S. Pat. No. 3,711,054.

Of course, the gas pressure is made sufficiently high that the expulsion force required to lift a supported object (table top, chair seat, or the like), said force being constituted by the product of the gas pressure and the free piston ring surface, is achieved at every position of the piston in the housing.

Sealing plug 8 and sleeve 20, if it proves necessary, may be further protected against displacement in housing 1 by means of beads fitting over their inwardly-located end faces in outside cylinder 3.

It will be obvious to those skilled in the art that various changes may be made without departing from the scope of the invention and the invention is not to be considered limited to what is shown in the drawings and described in the specification.

What is claimed is:

1. In a lengthwise adjustable, compressed-gas-filled spring comprising:
   an outer cylinder;
   an inner cylinder coaxially disposed in said outer cylinder, and defining an annular chamber therebetween;
   a piston axially displaceably mounted within said inner cylinder, said piston sealingly dividing the inside of said inner cylinder into a first and a second housing chamber;

a piston rod connected at one end to said piston on the side facing said first housing chamber, said piston rod extending out of said cylinders in a sealed manner;

connecting means for providing a fluid connection between said first housing chamber and the annular chamber; and valve means, operable from outside the cylinder, at the end of the cylinders opposite that from which the piston rod extends, for connecting or separating said second housing chamber from said annular chamber; the improvement wherein:

said inner cylinder is axially displaceable within said outer cylinder, is sealed off at the end opposite that from which said piston rod extends, and has a passageway therethrough in the vicinity of said sealed off end;

said spring further comprising sealing means in the vicinity of said passageway for sealing off said passageway in one axial position of said inner cylinder within said outer cylinder and for permitting access from said second housing chamber to said annular chamber through said passageway when said inner cylinder is in a second axial position within said outer cylinder, whereby said inner cylinder and said sealing means serve as said valve means.

2. A gas spring in accordance with claim 1 further including sleeve means for guiding said inner cylinder within said outer cylinder at the end thereof opposite that from which the piston rod extends.

3. A gas spring in accordance with claim 2 further including a stop ring on said inner cylinder which is capable of resting on said sleeve means when said inner cylinder is axially displaced to the position at which said sealing means seals off said passageway.

4. A gas spring in accordance with claim 2 wherein said sleeve means comprises a sleeve integrally connected to said outer cylinder.

5. A gas spring in accordance with claim 1 further including stop means for preventing said inner cylinder from sliding out of said outer cylinder.

6. A gas spring in accordance with claim 1 wherein the wall of said inner cylinder in the vicinity of said passageway is constricted into an annular channel.

7. A gas spring in accordance with claim 1 further including guide means for guiding said inner cylinder, at the piston rod end thereof, in a manner which is substantially free of radial play.

8. A gas spring in accordance with claim 7 further including sealing sleeve means for closing said outside cylinder around said piston rod in a fluid-tight manner, and a tubular stop on said sealing sleeve means radially guiding said inner cylinder.

9. A gas spring in accordance with claim 1 wherein said passageway is made in the form of a flow throttle.

* * * * *